3,467,737
PHENOLIC PHOSPHITES

Gordon D. Brindell, Wayne, N.J., assignor to Uniroyal, Inc., a corporation of New Jersey
No Drawing. Filed Nov. 8, 1965, Ser. No. 506,881
Int. Cl. C07f 9/12; C08f 45/58
U.S. Cl. 260—953        7 Claims

ABSTRACT OF THE DISCLOSURE

Hindered phenolic phosphites, such as tris[2,5-di(tertiary-butyl or -amyl)-4-hydroxyphenyl] phosphites (made by reacting the 2,5-di[tertiary alkyl] hydroquinone with $PCl_3$), or [2,5-di(tertiary-amyl)-4-hydroxyphenyl phenyl dodecyl phosphite (made by reacting 2,5-di-tert.-amylhydroquinone with triphenyl phosphite and n-dodecanol), are useful as stabilizers for polypropylene or other polymers.

---

This invention relates to new chemicals which contain in one molecule a phosphite function and a hindered phenolic function, and more particularly it relates to tertiary-alkyl-substituted para-hydroxyphenyl phosphites which may be obtained, according to one method of preparation, by reacting a tertiary-alkyl-substituted hydroquinone with insufficient phosphorous trichloride to react with both hydroxyl groups of the hydroquinone—that is, not more than one-third mole of phosphorous trichloride is used per mole of tertiary-alkyl-substituted hydroquinone.

The hindered phenolic phosphites of the invention are tertiary-alkyl-substituted para-hydroxyphenyl phosphites of the formula.

$$(L-O-)_x(M-O-)_yP$$

wherein M is a hydrocarbon group, $x$ is from 1 to 3, $y$ is from 0 to 2, $x$ plus $y$ equals 3, and L is a tertiary-alkyl-para-hydroxyphenyl group of the formula

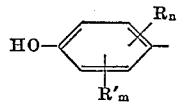

wherein R and R' are tertiary alkyl groups, $n$ is 1 or 2, $m$ is 0 or 1, and $n$ plus m is not greater than 2. The chemicals of the invention are remarkably useful in the preparation of stabilized synthetic rubber compositions, or in the stabilization of other polymers.

U.S. Patent 2,058,343, issued to Moran et al. on Oct. 20, 1936, refers to compounds described as the reaction products resulting from the reaction of trimolar amounts of phenol or substituted phenol with one mole of phosphorus trichloride. In one example, a material referred to as "triphosphite of hydroquinone," not otherwise described, is shown as a stabilizer for motor oil. This product is apparently less effective than triphenyl phosphite, triorthocresyl phosphite, and the like, from the standpoint of forestalling corrosion of metal exposed to the oil under oxidative conditions.

In any case, the reaction product of three moles of hydroquinone with one mole of phosphorus trichloride is not found to display the effectiveness desired in a stabilizer composition for polymers, unlike the chemicals of the invention derived from tertiary-alkyl-hydroquinones instead of from hydroquinone.

U.S. Patent 2,612,488, issued to J. F. Nelson on Sept. 30, 1952, discloses polymer arylene phosphites made by reacting a monohydric phenol, a dihydric phenol and phosphorous trichloride in 1:1:1 mole ratio. A typical structure is

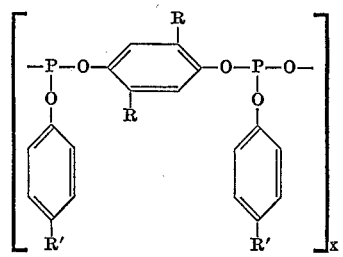

Combinations of hindered phenols and phosphites for the stabilization of SBR are disclosed in U.S. Patent 3,080,338 issued Mar. 5, 1963 to Nudenberg et al.

U.S. Patent 3,112,286, Morris et al., Nov. 26, 1963, shows phenolic phosphites derived from bis-phenols and describes their use as rubber stabilizers.

Considering in more detail the formula $$(L-O-)_x(M-O-)_yP$$

given above for the chemicals of the invention, one class of interest is that in which $y$ is zero, that is, chemicals which may be represented by the formula

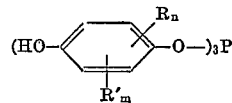

In the tris(tertiary-alkyl-para-hydroxyphenyl) phosphites of this class R and R' may be the same or different and contain from 4 to usually not more than 12 carbon atoms (e.g., tertiary-butyl, tertiary-amyl, 2,4,4-trimethylphenyl). When $n$ is one and $m$ is zero, the chemicals are derived from mono(tertiary-alkyl) hydroquinones, and the tertiary alkyl group may be in the 2- or 3-position in the phosphite, preferably in the 3-position. When $n$ plus $m$ equals two, the chemicals are derived from di(tertiary-alkyl) hydroquinones in which the tertiary alkyl groups are preferably in the 2- and 5-positions.

In the class of chemicals of the invention in which $y$ in the above formula is 1 or 2, M is, as indicated previously, a hydrocarbon group, while L may have any of the values previously stated. For example, group M may be alkyl, cycloalkyl, aryl, alkaryl, or aralkyl. Particularly useful products are obtained when M is an alkylated phenyl group such as butylphenyl, octylphenyl, nonylphenyl, dinonylphenyl, dodecylphenyl, etc. M may also be alkyl such as butyl, octyl, decyl, tridecyl, octadecyl, etc. The alkyl groups may be normal or branched.

Many of the chemicals of the invention are produced by reacting phosphorus trichloride with ammono- or di-tertiary-alkyl-hydroquinone or by reacting phosphorus tricholoride consecutively with a hydrocarbon-substituted phenol and the substituted hydroquinone. Alternatively, mixed phosphites related to the latter type can be made by treating a mixture of a substituted phenol and the tertiary-alkyl-hydroquinone with the appropriate amount of phosphorus trichloride. The quantity of phosphorous trichloride employed is sufficient to react with all the phenolic groups in the hydrocarbon-substituted phenol and half the phenolic groups on the substituted hydroquinone. If desired, a solvent such as benzene, toluene, xylene, chlorobenzene or dichlorobenzene may be used.

Another method that can be used to produce phosphites useful in my invention is to heat a phosphite ester with the tertiary-alkyl-hydroquinone. Catalysts may be employed such as those disclosed in U.S. Patent 3,053,878. For example, triphenyl phosphite heated with a tertiary-alkylated hydroquinone yields phosphites in which one or more of the phenyl groups of triphenyl phosphite is replaced by a tertiary-alkyl-4-hydroxyphenyl radical. Phenol distills slowly from the reaction, mixture leaving the desired product as a residue. Trialkyl phosphites such as tributyl phosphite or tridecyl phosphite can be similarly employed whereby the alcohol distills gradually from the hot reaction mixture. Mixed aryl alkyl phosphites can also be used. These reactions can be represented by the following equations.

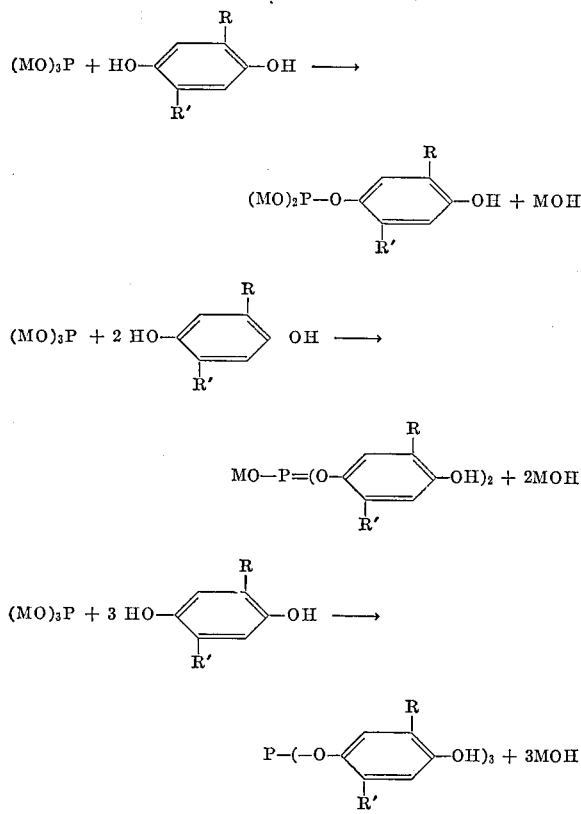

It will be understood that any given reaction product of the invention is not necessarily composed of a single chemical of the formula shown, but may be a mixture of chemicals. In the gross reaction product $x$ and $y$ and $m$ and $n$ in the formulas given above may have average values that are not whole numbers. For purposes of the invention it is neither necessary nor desirable to separate pure chemicals from the reaction product. In fact, the crude reaction product may in some cases be more effective than the purified chemical.

Examples of chemicals of the invention are:

tris[2,5-di(tertiary-butyl)-4-hydroxyphenyl] phosphite
tris[3,5-di(tertiary-amyl)-4-hydroxyphenyl] phosphite
bis[2,5-di(tertiary-butyl)-4-hydroxyphenyl] phenyl phosphite
bis[2,5-di(tertiary-amyl)-4-hydroxyphenyl] nonylphenyl phosphite
bis[2,5-di(tertiary butyl)-4-hydroxyphenyl] dinonylphenyl phosphite
bis[2,5-di(tertiary octyl)-4-hydroxyphenyl] tertiary-butyl phosphite
bis[2,5-di(tertiary-butyl)-4-hydroxyphenyl] decyl phosphite
bis[3-5-di(tertiary-butyl)-4-hydroxyphenyl] cyclohexyl phosphite
bis[2,5-di(tertiary-amyl)-4-hydroxyphenyl] phenylethyl phosphite
mono[2,5-di(tertiary-butyl)-4-hydroxyphenyl] bis-(dinonylphenyl) phosphite The following examples will serve to illustrate the practice of the invention in more detail.

EXAMPLE 1

Reactants:
    2,5-di-tert-butylhydroquinone (1.2 mole) __g__ 226
    Phosphorous trichloride (0.4 mole) _____g__ 55
    Diethyl ether _____ ml__ 500

Procedure.—The 2,5-di-tert-butylhydroquinone was entered into a one-liter, two-neck, round-bottom flask equipped with a thermometer, reflux condenser and $CaCl_2$ drying tube. Ether was added and most of the 2,5-di-tert-butylhydroquinone dissolved. The weighed $PCl_3$ was added in three portions to the refluxing solution. After a reflux period of about two hours, ether was removed from the top of a Vigreux column. When the ether had been removed, a white solid remained in the flask. It was removed, ground up and some residual volatiles removed under vacuum. The produce was analyzed for percent phosphorus.

Calc. for $C_{42}H_{63}O_6P$: P, 4.46%. Found: P, 4.30, 4.31%.

EXAMPLE 2

Reactants:
    2,5-di-tert-amylhydroquinone (0.9 mole)__g__ 225
    Phosphorous trichloride (0.3 mole)_____g__ 41.2
    Diethyl ether _____ml__ 400

Procedure.—The 2,5 - di - tert - amylhydroquinone and ether were combined in a one-liter, two-neck, round-bottom flask equipped with a thermometer and reflux condenser. One-half of the $PCl_3$ was added to the refluxing solution. The other half was added an hour later. The mixture was refluxed overnight. The ether was removed and the product crystallized. It was ground and vacuum stripped to remove volatiles. The product was analyzed for phosphorus.

Calc. for $C_{48}H_{75}O_6P$: P, 3.99%. Found: P, 3.73%; Cl, 0.31%.

To remove or deactivate this chlorine, 100 g. of the product was dissolved in 250 ml. ether. To this was added 1.2 ml. of propylene oxide and the mixture was refluxed for five hours. Ether was evaporated and the product vacuum stripped in a shallow dish at 45° for four hours. The product now analyzed: P, 3.74, 3.76%; Cl, 0.21%.

EXAMPLE 3

Reactants:
    Triphenyl phosphite (1.0 mole) _____g__ 310.3
    2,5-di-tert-amylhydroquinone (1.1 mole) __g__ 275

Procedure.—The 2,5-di-tert-amylhydroquinone and triphenyl phosphite were combined in a two-liter, round-bottom, two-neck flask equipped with a thermometer, distillation arm and receiver. The mixture stood overnight. The next day the flask was heated under vacuum and 103.0 g. (1.095 moles) of phenol was distilled off. The residue from distillation weighed 463 g. (99.5% yield). It was analyzed for phosphorus.

Calc. for $C_{28}H_{35}O_4P$: P, 6.64%. Found: P, 6.47, 6.43, 6.49%.

EXAMPLE 4

440 g. (2 moles) of mononoyl phenol was added dropwise (over a period of 1.5 hours) to 137.5 g. (1 mole) of phosphorus trichloride in a three-liter flask. Hydrogen chloride was copiously evolved. The mix was then gradually heated to 180° C. and maintained near that temperature for three hours. This product (substantially bis [nonyl phenoxy] phosphorus chloride) was diluted with 250 ml. of benzene.

The above solution was placed in an additional funnel and dropped (over 2.5 hours) into a stirred solution of 222 g. (1 mole) of 2,5-di-tert-butylhydroquinone in 250 ml. of benzene. The latter solution was maintained at 80–85° C. during the addition. The mix was refluxed for one hour after the addition was complete. The benzene was distilled off and the residue then heated to 220° C. for four hours until HCl was no longer evolved. Carbon dioxide was passed thru to sweep out traces of hydrogen chloride and 7.0 g. of propylene oxide was added. The product was substantially bis(nonylphenyl) mono(2,5-di-tert-butyl-4-hydroxyphenyl) phosphite.

EXAMPLE 5

111 g. (0.5 mole) of 2,5-di-tert-butylhydroquinone, 155 g. (0.5 mole) of triphenyl phosphite and 2.7 g. of diphenyl phosphite (catalyst) were heated with stirring for two hours at 240° C. in a one-liter, three-necked flask equipped with thermometer, mechanical stirrer, and a distillation head. The mix was cooled and a vacuum of 50 mm. of mercury was applied. The mix was slowly heated to 230° C. Phenol and a small quantity of unreacted 2,5-di-tert-butylhydroquinone were recovered. The residue (221 g.) was substantially diphenyl-mono(2,5 - di - tert-butyl-4-hydroxy) phenyl phosphite.

*Analysis.*—Percent P calculated: 7.10. Percent P found: 7.08, 7.21.

EXAMPLE 6

250 g. (1 mole) of 2,5-di-tert-amylhydroquinone and 310 g. (1 mole) of triphenyl phosphite were heated for two hours at 230° C. in a one-liter flask equipped with thermometer and distillation head. The mix was cooled and a vacuum (20 mm. of mercury pressure) applied. The mix was heated again to 230° C. as approximately one mole of phenol distilled off. The distillation was interrupted and 186.5 g. (1 mole) of n-dodecanol was added. The mixture was then heated (at atmospheric pressure) to 230° C. for two hours. It was then cooled and vacuum was applied (20 mm. of mercury pressure). Heating was resumed and approximately one mole of phenol was removed. The material remaining in the flask was largely phenyl dodecyl 2,5-di-tert-amyl-4-hydroxyphenyl phosphite.

The utility of the chemicals of the invention in the stabilization of polymers may be demonstrated by molding discs of polypropylene 90 mils thick, containing the chemical to be tested, and exposing the disk to a temperature of 300° F. in an air-circulating oven. Three such discs are usually used; when crumbling occurs on two of the three discs, the samples is reported as "broken." The following table, in which the amounts of chemicals tested are expressed as percent by weight of the polypropylene, shows the number of days required for break to occur.

| Test | Chemical (percent by weight in propylene) | Days to break (300° F.) |
|---|---|---|
| A | None | 1 |
| B | 0.4 dilauryl thiodipropionate | 14 |
| C | 0.1 reaction product of triphenyl phosphite, 2,5-di-tert-amyl hydroquinone and dodecyl alcohol (1:1:1) (2 moles of phenol recovered), 0.4 dilauryl thiodipropionate. | 52 |
| D | 0.1 reaction product of hydroquinone and phosphorus trichloride (3:1), 0.4 dilauryl thiodipropionate. | 18 |

It will be noted that the "hydroquinone phosphite" prepared from unalkylated hydroquinone and phosphorus trichloride (Test D), shows practically no advantage over dilauryl thiodipropionate alone (Test B), whereas the 2,5-di-tertiary-amyl chemical of the invention (Test C), is vastly superior.

Further details of the utility of the present chemicals in polypropylene are contained in my copending application Ser. No. 506,867, filed of even date herewith.

Having thus described my invention, what I claim and desire to protect by Letters Patent is:

1. A chemical having the structural formula $$(L-O-)_x(M-O-)_yP$$

wherein M is a hydrocarbon group selected from phenyl, alkylphenyl in which the alkyl group has from 4 to 12 carbon atoms, and alkyl having 4 to 18 carbon atoms, $x$ is from 1 to 3, $y$ is from 0 to 2, and $x$ plus $y$ equals 3, and L represents a 2,5-di(tertiary alkyl) substituted para hydroxy phenyl group in which the tertiary alkyl groups are tertiary butyl, tertiary amyl, or 2,4,4-trimethylpentyl.

2. A chemical as in claim 1, which is tris[2,5-di(tertiary-butyl)-4-hydroxyphenyl] phosphite.

3. A chemical as in claim 1, which is tris[2,5-di(tertiary-amyl)-4-hydroxyphenyl] phosphite.

4. A chemical as in claim 1, which is bis[2,5-di(tertiary-amyl)-4-hydroxyphenyl] phenyl phosphite.

5. A chemical as in claim 1, which is mono[2,5-di(tertiary - butyl) - 4 - hydroxyphenyl] bis(nonylphenyl) phosphite.

6. A chemical as in claim 1, which is bis[2,5-di(tertiary-butyl)-4-hydroxyphenyl] phenyl phosphite.

7. [2,5 - di(tertiary-butyl) - 4 - hydroxyphenyl] phenyl dodecyl phosphite.

References Cited

UNITED STATES PATENTS

| 2,612,488 | 9/1952 | Nelson et al. | 260—976 XR |
| 3,112,286 | 11/1963 | Morris et al. | 260—976 XR |

OTHER REFERENCES

Kadyrova et al.: "Chemical Abstracts," vol. 60, p. 3109, 1964.

JOSEPH P. BRUST, Primary Examiner

ANTON H. SUTTO, Assistant Examiner

U.S. Cl. X.R.

260—45.95, 976, 982